(12) United States Patent
Boersma et al.

(10) Patent No.: US 8,244,783 B2
(45) Date of Patent: Aug. 14, 2012

(54) NORMALIZER SHIFT PREDICTION FOR LOG ESTIMATE INSTRUCTIONS

(75) Inventors: Maarten J. Boersma, Holzgerlingen (DE); Michael Klein, Schoenaich (DE); Jochen Preiss, Boeblingen (DE); Son Dao Trong, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 12/208,439

(22) Filed: Sep. 11, 2008

(65) Prior Publication Data

US 2010/0063985 A1    Mar. 11, 2010

(51) Int. Cl.
*G06F 5/01* (2006.01)
(52) U.S. Cl. ........................ 708/211; 708/205
(58) Field of Classification Search .................. None
See application file for complete search history.

(56) References Cited

U.S. PATENT DOCUMENTS

| | | | | |
|---|---|---|---|---|
| 5,574,670 A | * | 11/1996 | Lozano | 708/211 |
| 5,798,953 A | * | 8/1998 | Lozano | 708/211 |
| 6,779,008 B1 | * | 8/2004 | Erle et al. | 708/211 |
| 7,461,110 B2 | * | 12/2008 | Kaplun et al. | 708/211 |
| 2010/0174764 A1 | * | 7/2010 | Boersma et al. | 708/205 |
| 2011/0040815 A1 | * | 2/2011 | Penton et al. | 708/205 |
| 2011/0231460 A1 | * | 9/2011 | Ahmed | 708/205 |

OTHER PUBLICATIONS

PowerPC Microprocessor Family: Vector/SIMD Multimedia Extension Technology Programming Environments Manual, Version 2.06, IBM Corporation, Aug. 22, 2005.
Vojin G. Oklobdzija, "An Algorithmic and Novel Design of a Leading Zero Detector Circuit: Comparison with Logic Synthesis," Transactions Briefs, IEEE Transactions on Very Large Scale Integration (VLSI) Systems, vol. 2, No. 1, pp. 124-128, Mar. 1994.
Martin S. Schmookler, et al., "A Low-power, High-speed Implementation of a Power PC Microprocessor Vector Extension," Proceedings of the 14th IEEE Symposium on Computer Arithmetic, pp. 1-8, 1999.
Eric M. Schwarz, "Binary Floating-Point Unit Design: the fused multiply-add dataflow," IBM Corporation; Integrated Circuits and Systems, pp. 189-208; 2006.
Son Dao Trong, et al.,"P6 Binary Floating-Point Unit," IBM Server Division. IEEE Symposium on Computer Arithmetic 2007: pp. 77-86.

* cited by examiner

*Primary Examiner* — David H Malzahn
(74) *Attorney, Agent, or Firm* — Cantor Colburn LLP; Diane Roberts-Gerhardt

(57) ABSTRACT

A floating point processor unit includes a shift amount calculation circuit within a normalizer portion of the floating point unit, wherein the shift amount calculation circuit is utilized to compute the normalizer shift amount for a log estimate instruction that runs as a pipelinable instruction.

12 Claims, 2 Drawing Sheets

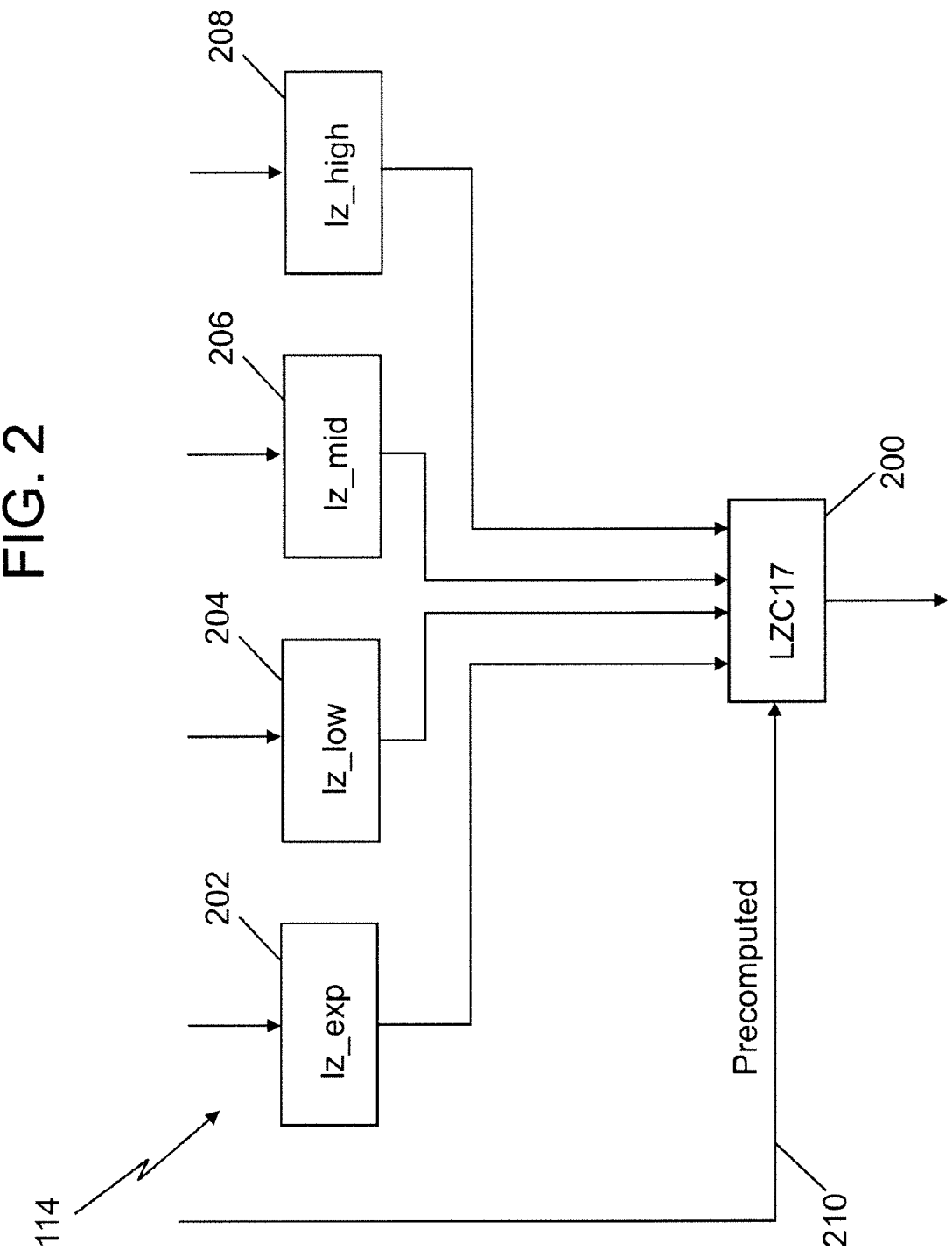

NORMALIZER SHIFT PREDICTION FOR LOG ESTIMATE INSTRUCTIONS

GOVERNMENT RIGHTS

This invention was made with Government support under Contract No. HR0011-07-9-0002 awarded by DARPA. The Government has certain rights in this invention.

BACKGROUND

The present invention relates generally to floating point processors, and, more particularly, to a normalizer shift prediction for log estimate instructions executed by a floating point processor.

In a floating point processor unit ("BFU"), the computation of a logarithm ("log") estimate instruction differs from the standard multiply and add instructions used in almost all modern floating point units. Nevertheless, to save space and power, it is desirable to reuse as much of the present data paths and logic as possible, especially with respect to relatively large circuits such as a normalization shifter within the normalizer circuit or portion of the BFU. Reusing hardware is generally no problem for floating point processor designs where there is only one instruction in execution at a given time. The instruction can choose freely which part of the hardware it wants to use at any time during its execution.

However, if the floating point processor unit is a pipelined design, the execution of an instruction is bound to using a predefined part of the hardware in each execution cycle. This prohibits the use of the normalizer circuit for a straightforward implementation of the log estimate instruction. This is because the amount of work that has to be done to compute the shift amount which is fed to the normalizer circuit is greater than for standard multiply and add instructions. The normalizer shift amount for the log estimate instruction is equal to the number of leading zeroes of the instruction results intermediate significand. A relatively simple solution may be a leading zero counter circuit over the complete width of the result intermediate significand. The problem, however, with this implementation is that it is relatively complex and thus not fast enough to fit into the pipelined dataflow. Another possible solution is to switch the floating point unit into a multi-cycle mode. In this mode, an instruction is allowed to use the pipeline multiple times, which permits the insertion of additional cycles by later jumping back to the start of the pipeline. The disadvantage of this solution is that it severely limits the throughput of instructions by the floating point processor unit.

BRIEF SUMMARY

According to an embodiment of the invention, a floating point processor unit includes a shift amount calculation circuit within a normalizer portion of the floating point unit, wherein the shift amount calculation circuit is utilized to compute the normalizer shift amount for a log estimate instruction that runs as a pipelinable instruction.

BRIEF DESCRIPTION OF THE SEVERAL VIEWS OF THE DRAWINGS

Referring to the exemplary drawings wherein like elements are numbered alike in the several Figures:

FIG. 2 is a block diagram of a portion of a normalizer circuit of the floating point processor unit of FIG. 1 in which an embodiment of the invention may be implemented.

DETAILED DESCRIPTION

Figure 1:
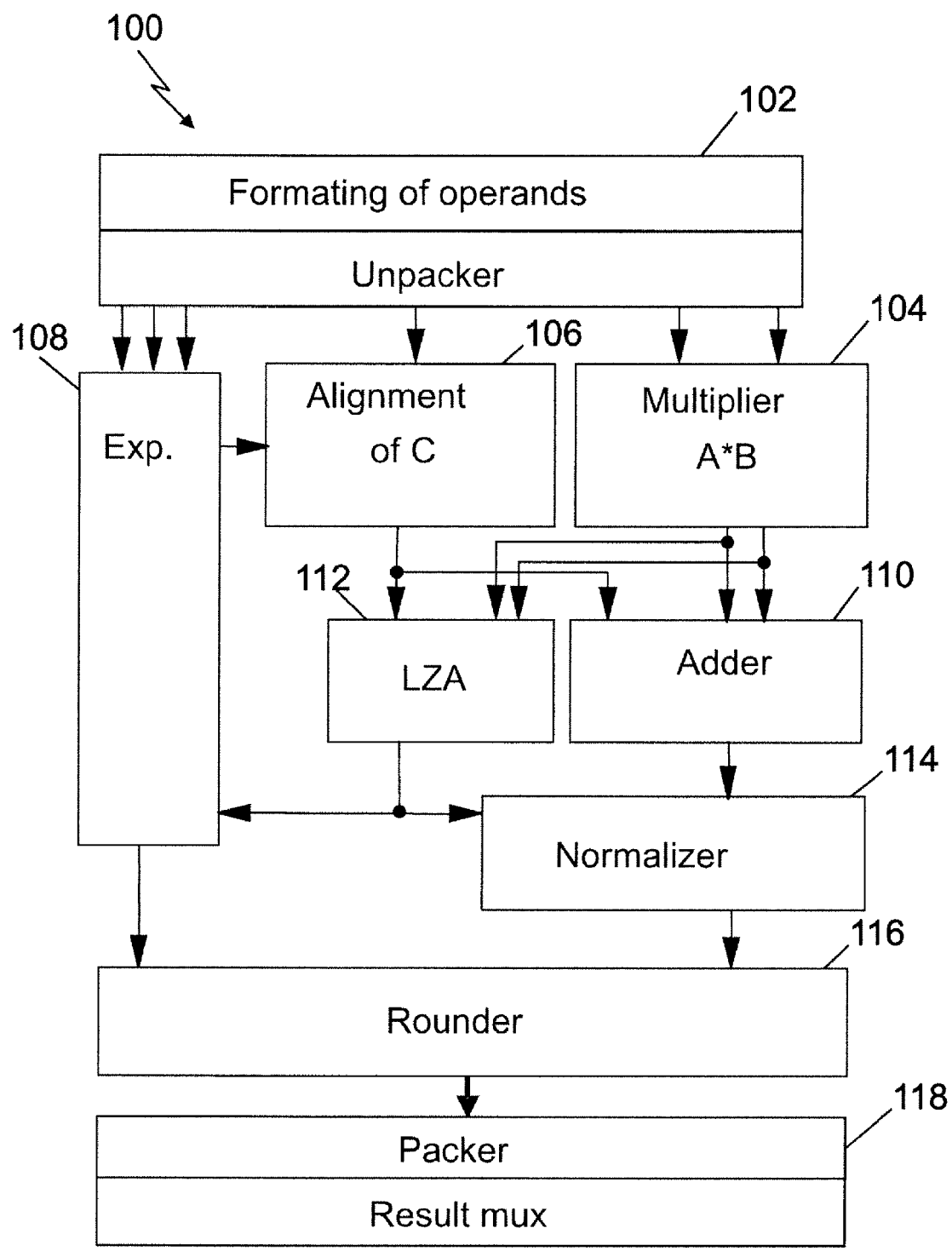
FIG. 1 is a block diagram of a floating point processor unit.

Referring to FIG. 1, there illustrated is a block diagram of a floating point processor unit ("BFU") 100, in which an embodiment of the invention may be implemented. The BFU 100 may operate according to the fused multiply-add dataflow ("R=C+A*B"), where "A" is the multiplicand, "B" is the multiplier, "C" is the addend, and "R" is the result. The dataflow of the BFU 100 illustrated in FIG. 1 includes a block 102 to format and unpack the operand into its sign, exponent and significand components. The dataflow also includes a multiplier 104, a block 106 to properly align the addend to the product of the multiplier before the addend can be added or combined with the product, and an exponent dataflow block 108. The BFU dataflow further includes an adder 110, a leading zero anticipator ("LZA") 112, a normalizer 114, a rounder 116, and a packer 118 along with its corresponding result multiplexer that converts the rounded result back into the instruction specific format.

Referring to FIG. 2, there illustrated in block diagram format is a portion of the normalizer 114 of the floating point processor unit 100 of FIG. 1 in an embodiment of the present invention for executing a log estimate instruction. In the embodiment of the invention disclosed herein, the normalizer shift amount is computed relatively fast, the result of which is that the log estimate instruction may use the normalizer circuit in a standard pipelined manner.

A typical floating point number format includes a single sign bit, s, an exponent, e, that comprises multiple bits, and a significand, s, which itself is composed of an integer part, i, and a fraction part, f, that both also comprise multiple bits. The integer part for standard floating point numbers is an implied unit bit which considered to be "1" for normal numbers and "0" for zeroes and subnormal numbers. For example, for a 64-bit double precision word, besides the single sign bit, the exponent comprises 11 bits and the fraction part comprises 52 bits. All of the bits within the floating point number are binary integer value bits (i.e., either a binary logic "0" or "1"). The value for the log estimate instruction is $(-1)^s \times 2^e \times 1.f$, and the log function is defined as $\log(2^e \times 1.f) = \log(2^e) + \log(1.f) = e + \log(1.f)$. The number $e + \log(1.f)$ is called the intermediate significand with integer part e and fraction part log (1.f). When executing the log estimate instruction, normalizing is needed to put the intermediate significand of the result into the correct format. Typically, the result intermediate significand is shifted to correct the floating point format (1.f), and the exponent is changed accordingly. The normalizer shift amount is typically determined by counting the number of leading zeroes of an x-bit vector using an x-bit leading zero counter (LZCx), a number of which are usually built recursively. The all zero signals are typically on the timing critical path in each of the smaller LZCx's. Additional logic in the muxsel circuit adds to the timing critical path. Thus, it has not been possible to fit the logic in the standard multiply and add dataflow because the normalizer shift amount takes too long to compute.

In accordance with an embodiment of the invention, the normalizer shift amount is pre-computed or predicted as far in advance as possible, thus removing the timing critical path in the LZCx circuit. To compute the number, lz_res, of leading zeroes of the result fraction faster than by just counting them, it has been discovered that there are mathematical relationships between the number of leading zeroes of the result intermediate significand, lz_res, and both the number of leading zeroes of the input operands fraction, lz_in, and the number of leading zeroes of the input exponent, lz_exp. These relationships can be used to narrow down the possible number of leading zeroes of the result intermediate significand to a small interval depending on the input operand and the input exponent. It then suffices to count the leading zeroes in the resulting interval range to determine the correct normalizer shift amount. The small counters utilized can be implemented in parallel for all possible intervals, as illustrated in FIG. 2. Counting the input fractions leading zeroes helps to determine which ones of the counter results to use to compute the correct result for the normalizer shift amount.

The standard dataflow for log estimate instructions is as follows: 1) normalize the input operand if it is denormal; 2) compute the exponent of the result; 3) compute the intermediate significand of the result in the following three steps: (i) the exponent of the input operand forms the integer part of the result intermediate significand; and; (ii) use a lookup table or other kinds of approximation to compute the fraction part of the result intermediate significand; and 4) convert the result intermediate significand to floating point format by normalization. Steps 2 and 3 may be performed in parallel. From step 3 of this algorithm, it can be seen that lz_res can fall into two different categories: 1) if the input operands exponent is not all zeroes, lz_res equals the number lz_exp of leading zeroes of the input operands exponent (since the exponent is typically known early, this number can be counted in parallel to the computation of the lower result fraction bits); and 2) if the input operands exponent is all zeroes, lz_res equals the number lz_frac of leading zeroes of the result fraction bits plus the number num_exp of exponent bits, which is a constant.

In a preferred embodiment of the invention, a lookup table with the following relationships may be used for the pre-computation of leading zeroes of the result fraction bits, lz_frac: 1) if lz_in lies between 0 and 4, lz_frac lies between 0 and 4; 2) if lz_in lies between 5 and 8, lz_frac lies between 4 and 8; and 3) if lz_in is greater than 8, lz_frac lies between 8 and 11. As soon as the result fraction bits are computed, the following numbers of leading zeroes are counted in parallel: 1) lz_low is the number of leading zeroes of the fraction bits 0 to 4; 2) lz_mid is the number of leading zeroes of the fraction bits 4 to 8; and 3) lz_high is the number of leading zeroes of the fraction bits 8 to 11. Which one of these three ranges is used in determining or predicting the normalizer shift amount depends on the input fraction leading zeroes, lz_in. The number of leading zeroes of the complete result fraction, lz_res, computes as: 1) if the input operands exponent is not zero, then lz_res=lz_exp; 2) if the input operands exponent is zero and lz_in lies between 0 and 4, then lz_res=num_exp+lz_low; 3) if the input operands exponent is zero and lz_in lies between 5 and 8, then lz_res=num_exp+4+lz_mid; and 4) if the input operands exponent is zero and lz_in is greater than 8, then lz_res=num_exp+8+lz_high. Since num_exp is a constant, adding num_exp, (num_exp+4) or (num_exp+8) does not require an adder but can directly be pre-computed when determining lz_low, lz_mid or lz_high. The final mux select signals are pre-computed, thus eliminating the critical timing path of the known leading zero circuit. This allows use of the normalizer circuit 114 (FIG. 1) in the correct cycle to execute the log estimate instruction as a pipelinable instruction.

Referring to FIG. 2, there illustrated in block diagram form is a portion of the normalizer circuit 114 of FIG. 1 implementing an embodiment of the invention. The normalizer 114 includes a "final" 17-bit leading zero counter ("LZC17") 200, along with four, 5-bit leading zero counters: lz_exp 202, lz_low 204, lz_mid 206, and lz_high 208. Which one of the 5-bit leading zero counters 202-208 to use in determining the normalizer shift amount depends on the pre-computation operations for lz_res performed as described in the paragraph above. A "pre-computed" signal on a line 210 is provided to LZC17 200 as a "mux select signal" in dependence on the result of the pre-computations for lz_res described above. The signal 210 is then used to select the one of the four 5-bit counters 202-208 to provide its output to the counter LZC17 200.

In case of a negative exponent, the embodiment of the invention described hereinabove for implementing the log estimate instruction stays mostly the same, except that the leading ones are counted instead of the leading zeroes. The remaining portions of the embodiment of the invention are the same in the case of a negative exponent.

As mentioned, the embodiment of the invention improves the timing of the execution of the log estimate instruction enough to implement the instruction as a pipeline instruction within the BFU 100. This improves not only the performance of the log estimate instruction itself, but also the throughput of other pipelined floating point instructions following the log estimate instruction. This is because the floating point processor unit 100 is not switched to the multi-cycle mode.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for counting the number of leading zeros of an input vector of width n, comprising:
   a plurality of leading zero counters that count the number of leading zeros of parts of the input vector with the width of each part being smaller than n and the sum of the widths of the parts being larger than n; and
   a final multiplexer with inputs connected to an output of each one of the plurality of leading zero counters, wherein the final multiplexer is responsive to a pre-computed select signal on a line that indicates to the final multiplexer which one of the plurality of leading zero counters to utilize.

2. The system of claim 1, wherein the pre-computed select signal can be computed without full knowledge of the input vector itself.

3. The system of claim 2, wherein the system is part of a floating point processor computing a log estimate instruction, wherein the input vector is the unbiased input exponent concatenated with an estimate of the logarithm of the input fraction.

4. The system of claim 3, wherein the pre-computed select signal is based on the number of leading zeros of the input exponent and input fraction.

5. A method for counting the number of leading zeros of an input vector of width n, comprising:
   providing a plurality of leading zero counters that count the number of leading zeros of parts of the input vector with the width of each part being smaller than n and the sum of the widths of the parts being larger than n; and
   providing a final multiplexer with inputs connected to an output of each one of the plurality of leading zero counters, wherein the final multiplexer is responsive to a pre-computed select signal on a line that indicates to the final multiplexer which one of the plurality of leading zero counters to utilize.

6. The method of claim 5, wherein the pre-computed select signal can be computed without full knowledge of the input vector itself.

7. The method of claim 6, wherein the plurality of leading zero counters and the final multiplexer are part of a floating point processor that computes a log estimate instruction, wherein the input vector is the unbiased input exponent concatenated with an estimate of the logarithm of the input fraction.

8. The method of claim 7, wherein the pre-computed select signal is based on the number of leading zeros of the input exponent and input fraction.

9. A method for counting the number of leading zeros of an input vector of width n, comprising:
   utilizing a plurality of leading zero counters to count the number of leading zeros of parts of the input vector with the width of each part being smaller than n and the sum of the widths of the parts being larger than n;
   providing a pre-computed signal select on a line;
   utilizing a final multiplexer with inputs connected to an output of each one of the plurality of leading zero counters, wherein the final multiplexer is responsive to the pre-computed select signal on the line that indicates to the final multiplexer which one of the plurality of leading zero counters to utilize.

10. The method of claim 9, wherein the pre-computed select signal can be computed without full knowledge of the input vector itself.

11. The method of claim 10, wherein the plurality of leading zero counters and the final multiplexer are part of a floating point processor that computes a log estimate instruction, wherein the input vector is the unbiased input exponent concatenated with an estimate of the logarithm of the input fraction.

12. The method of claim 11, wherein the pre-computed select signal is based on the number of leading zeros of the input exponent and input fraction.

\* \* \* \* \*